Figure 1:
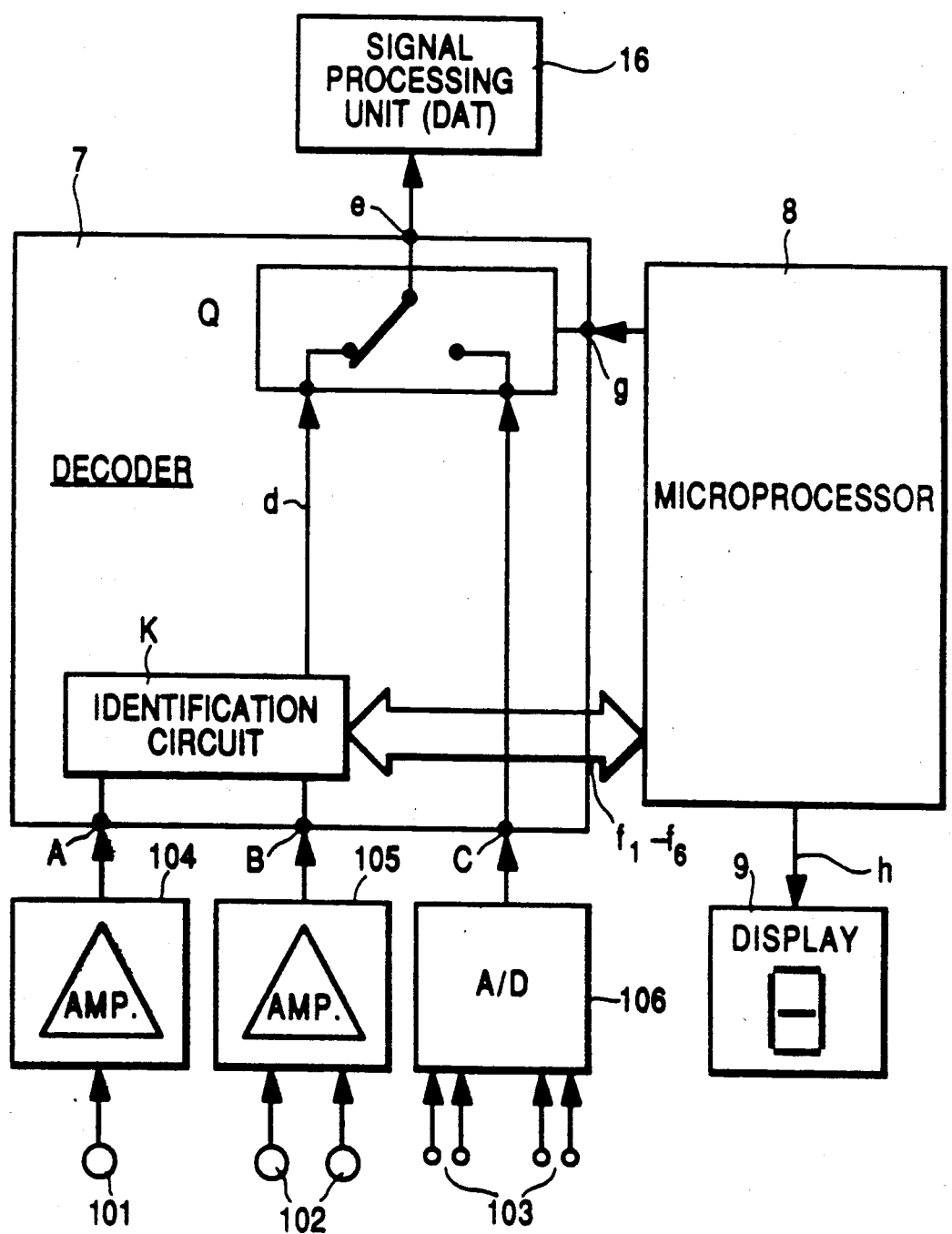

United States Patent [19]

Kaaden et al.

[11] Patent Number: 5,036,409
[45] Date of Patent: Jul. 30, 1991

[54] SIGNAL SELECTION ARRANGEMENT

[75] Inventors: Jürgen Kaaden, VS-Villingen; Dietmar Uhde, Königsfeld, both of Fed. Rep. of Germany

[73] Assignee: Deutsche Thomson-Brandt GmbH, Villingen-Schwenningen, Fed. Rep. of Germany

[21] Appl. No.: 323,723

[22] Filed: Mar. 15, 1989

[51] Int. Cl.$^5$ .......................... G11B 5/09; G11B 15/12
[52] U.S. Cl. .......................................... 360/51; 360/61
[58] Field of Search ....................... 360/27, 60, 61, 68, 360/69; 369/32

[56] References Cited

U.S. PATENT DOCUMENTS

| 3,922,641 | 11/1975 | Gates, Jr. | 328/154 |
| 4,151,565 | 4/1979 | Mazzola | 360/40 |
| 4,231,071 | 10/1980 | Anderson | 360/51 |
| 4,398,219 | 8/1983 | Yasuda | 358/167 |
| 4,688,205 | 8/1987 | Abiko | 361/51 |
| 4,872,151 | 10/1989 | Smith | 369/32 |

FOREIGN PATENT DOCUMENTS 3126731 6/1987 Fed. Rep. of Germany .
2152269 6/1987 United Kingdom .

Primary Examiner—Aristotelis M. Psitos
Assistant Examiner—Won Tae C. Kim
Attorney, Agent, or Firm—Joseph S. Tripoli; Joseph J. Laks; Sammy S. Henig

[57] ABSTRACT

Several signal sources that produce corresponding digitally coded signals are coupled to a selection circuit. A microprocessor controls signal selection switches that select one of the signal sources in accordance with a priority schedule, provided that the signal source produces a signal at a frequency that is within a predetermined range of frequencies. The selected signal is then recorded in a tape recorder or forwarded to a signal reproducer device. To test whether a given signal source generates a signal at a frequency that is suitable for recording or reproducing purposes, the digitally coded signals from that source is coupled to an input of a phase-lock-loop circuit (PLL). When the signal causes a lock-in condition in the PLL, that signal source is then selected. If the lock-in condition does not occur, the test is applied to another signal source that is next in the priority schedule.

4 Claims, 2 Drawing Sheets

SIGNAL SELECTION ARRANGEMENT

The invention relates to an arrangement for selecting a signal from a plurality of input signals. The selected signal may, for example, contain data that is to be recorded by a tape recorder or reproduced in a signal reproducer.

In well known signal recorders and/or signal playback sets, a signal is selected from different signal sources and coupled to a signal processing arrangement such as, for example, a digital audio tape recorder (DAT) using a manually controlled selector switch. The signal sources may include signal sources of analog signals and/or of digital signals. Disadvantageously, each time a selection change occurs, such change may have to be carried out manually by an operator.

It may be desirable to automatically select the signal source for providing an input signal for recording in, for example, a DAT such that manual intervention is not required. In this way, the manual selector switch is eliminated.

In an arrangement embodying an aspect of the invention, signal sources developed at corresponding input terminals are selectively coupled to a detector in an order, or sequence that is determined in accordance with a predefined priority schedule. The detector is controlled by a microprocessor that establishes the priority schedule for the selection procedure of the signal sources. The priority schedule is programmed or programmable in the microprocessor.

The signal sources generate, for example, the following input signals for selecting therefrom in accordance with the selection procedure an input signal that is to be coupled to the DAT.

1. A digitally coded signal received via an optical guide;
2. A digitally coded signal received via a transmission line cable; and
3. An analog signal received via a transmission line cable.

In a given step of the selection procedure, an input signal of a signal source, meeting predetermined criteria and having a higher priority according to the priority schedule than any of the other signal sources, is selected for evaluation in the detector. If the detector recognizes such signal to be suitable for signal processing, this selection state is maintained unchanged and such signal is selected for processing in the signal processing device such as the DAT. For reasons of signal quality, this signal may be the signal which is received via an optical guide; alternatively, such signal may be any of the other available signals, according to the predefined priority schedule.

A signal recorder or reproducer apparatus, embodying an aspect of the invention, includes a plurality of input terminals, each receiving a corresponding input signal from a corresponding signal source. A frequency detector that is coupled to the input terminals produces a detector output signal. The input terminal that receives a corresponding input signal, having both a frequency that is within a predetermined range of frequencies as determined by the detector output signal and a priority as determined by a priority obtained from a priority schedule in accordance with a selection procedure, is selected. A signal recording or reproducing arrangement is coupled to the selected input terminal for recording or reproducing the selected input signal.

Figure 2:
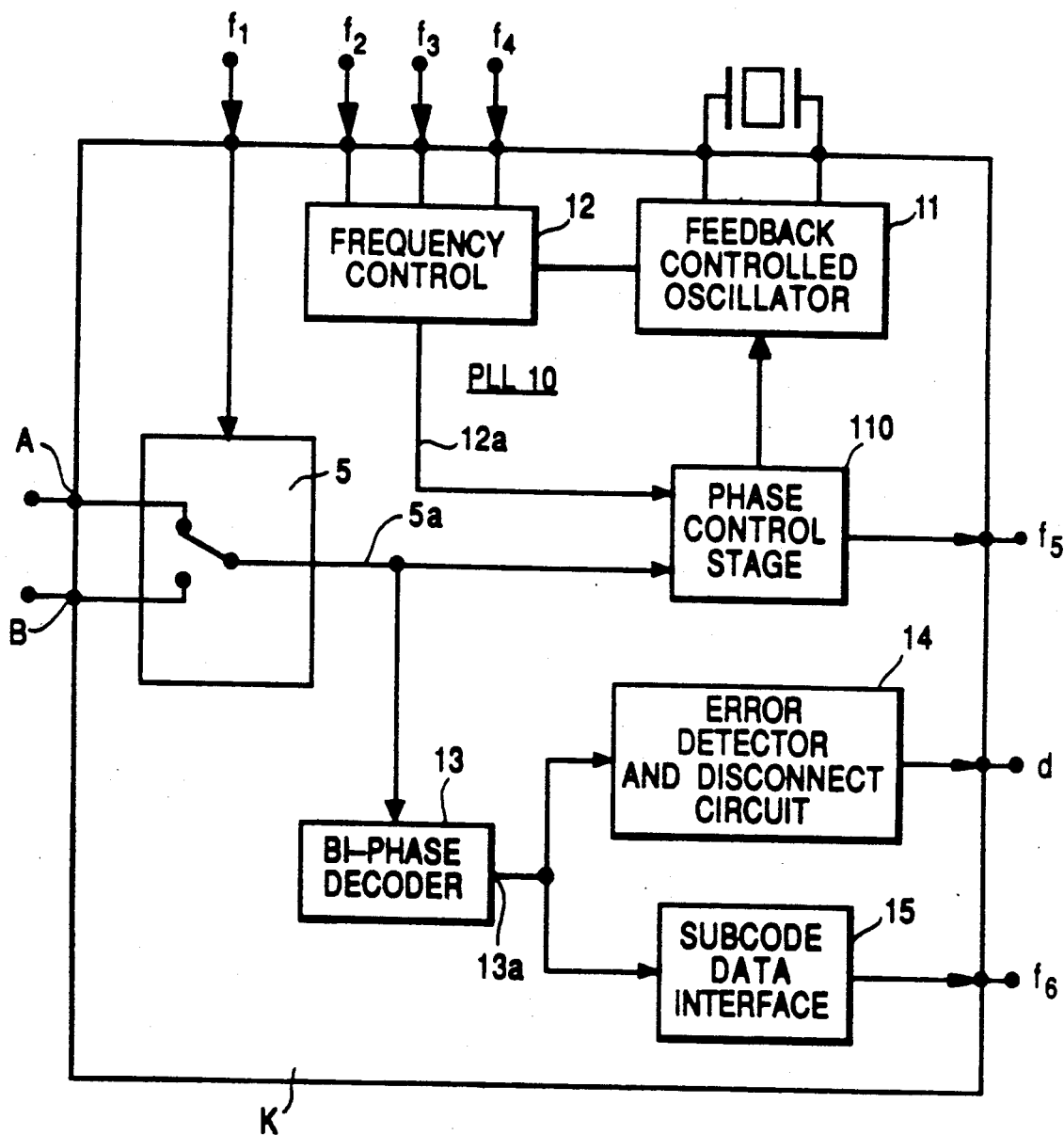

FIG. 1 illustrates a block diagram of an arrangement, embodying an aspect of the invention, for selecting a signal source from a plurality of signal sources; and FIG. 2 illustrates in more detail a block diagram of an identification circuit block of FIG. 1.

A digitally coded input signal generated in, for example, a digital recorder such as DAT is received via an optical guide, not shown, and is coupled to an input terminal 101 of an amplifier 104 of FIG. 1. The signal at terminal 101 is coupled via amplifier 104 to an input terminal A of a decoder 7, embodying an aspect of the invention. A second digitally coded input signal generated in, for example, a second DAT is received via a transmission line cable, not shown, and developed at a terminal 102. The signal at terminal 102 is coupled via an amplifier 105 to an input terminal B of decoder 7. The digitally coded signals have, for example, TTL-levels, and are bi-phase coded, as defined in STANDARDS AND INFORMATION DOCUMENTS AES 3-1985 (ANSI S4.40-1985). Possible clock frequencies of such digital signals are, for example, 32 KHz, 44.1 KHz and 48 KHz. In addition, analog signals that are, for example, a pair of stereo signals generated in an analog record player or in a radio receiver are coupled to an input 103 of an analog-to-digital (A/D) converter 106. A/D converter 106 generates therefrom a digital input signal at an input terminal C.

Decoder 7 includes an identification circuit K that is controlled by a microprocessor 8 via conductors $f_1$-$f_6$. Microprocessor 8 is controlled by a program that is stored for implementing a predetermined priority schedule. Microprocessor 8 has an output that is coupled to an indicator circuit 9 via a conductor h for providing display information regarding the state of identification circuit K.

A switch Q of decoder 7 has a first input terminal that is coupled via a conductor d to an output terminal of identification circuit K. A second input terminal of switch Q is coupled to an output terminal C of A/D converter 106. A/D converter 106 generates a digital signal representing the analog signal that is developed at input 103. Switch Q couples to an output terminal e of decoder 7 one of the signals at terminal C and the signal that is developed in conductor d, depending on a state of a control signal that is developed at a terminal g. The control signal developed at terminal g is generated by microprocessor 8. The selected output signal at terminal e is coupled to an input terminal of a signal processing unit 16 that is, for example, a DAT or a signal reproducing device that reproduces the signal content.

FIG. 2 illustrates in more detail the block diagram of identification circuit K of FIG. 1. Similar symbols and numerals in FIGS. 1 and 2 indicate similar items or functions. Identification circuit K of FIG. 2 includes a selection switch S having a first input terminal that is coupled to terminal A and a second input terminal that is coupled to terminal B. Microprocessor 8 generates a control signal on conductor $f_1$ that is coupled to a control terminal of switch S. The control signal on conductor $f_1$ determines which of the signals, at terminals A and B, is to be coupled to a conductor Sa.

A feedback controlled oscillator 11 that is coupled to a programmable frequency control circuit 12 generates a clock signal in a conductor 12a. The signal in conductor 12a is at a frequency that is determined by control signals developed in conductors $f_2$-$f_4$ and generated in microprocessor 8 of FIG. 1. Control circuit 12 varies the fundamental frequency of oscillator 11 to establish a corresponding lock-in frequency range.

Assume that during the selection procedure one of the digital signals at terminals A and B such as, for example, the signal at terminal A has the highest priority in the priority schedule. In the corresponding step of the selection procedure, microprocessor 8 causes the signal developed in conductor d to be coupled to terminal e. Switch S of FIG. 2, under the control of microprocessor 8 of FIG. 1, will couple the signal at terminal A of FIG. 2 to conductor Sa. Also, microprocessor 8 of FIG. 1 will generate the signals on lines $f_2-f_4$ at states that cause the signal in conductor 12a of FIG. 2 to assume one of the selected frequencies. The frequency of the signal in conductor 12a is selected to be approximately equal to the expected clock frequency of the signal in conductor Sa.

The signals in conductors 12a and Sa are coupled to corresponding input terminals of a phase control stage 110 that may include, for example, a phase detector and a low-pass filter, not shown. Phase control stage 110, control circuit 12 and oscillator 11 form a phase-lock-loop circuit (PLL) 10. The frequency of the signal in conductor 12a determines the lock-in range of PLL 10.

PLL 10 generates an output signal in conductor $f_5$, provided the signal in conductor 12a causes PLL 10 to be phase-locked to the signal in conductor Sa. When the signal in conductor $f_5$ is indicative of such lock-in condition in PLL 10, microprocessor 8 of FIG. 1 will terminate the selection process and the connection states of switches Q of FIG. 1 and of switch S of FIG. 2, respectively, will be maintained unchanged until a new selection procedure is initiated or until a signal outage occurs, whichever occurs earlier, as explained later on.

On the other hand, if no phase-lock condition occurs in PLL 10 of FIG. 2 for a given frequency of the signal in conductor 12a that is determined by frequency control circuit 12, microprocessor 8 will cause the control signals in conductors $f_2-f_4$ to assume different states that cause the signal in conductor 12a to be at a second discrete frequency that is different. Thereafter, microprocessor 8 of FIG. 1 will test the output signal on conductor $f_5$ of FIG. 2 for determining whether PLL 10 is in the lock-in condition when the second frequency occurs. Such frequency selection steps will continue for all the possible frequencies of the signal on conductor 12a until either a lock-in condition occurs in PLL 10 or each of the possible frequencies of the signal in conductor 12a has been applied to stage 110 but all failed to cause the lock-in condition in PLL 10.

If, after all the possible frequencies of the signal in conductor 12a are applied but none causes the lock-in condition in PLL 10, microprocessor 8 of FIG. 1 will cause the signal at terminal B, having a lower priority than that of the signal at terminal A, to be coupled to conductor Sa of FIG. 2, instead of the signal at terminal A. Thereafter, the aforementioned frequency selection steps will occur with respect to the signal at terminal B. If no lock-in condition occurs with respect to the signal at terminal B at any of the possible frequencies of the signal in conductor 12a, microprocessor 8 of FIG. 1 will generate the control signal at terminal g of decoder 7 at a state that causes switch Q to couple the signal at terminal C, produced by A/D converter 106, to terminal e. In this situation, the analog signal at input 103 will be recorded in the DAT.

Assume that a lock-in condition in PLL 10 has occurred when one of the signals at terminal A or B is coupled to conductor Sa. Such signal in line Sa is coupled to a conventional bi-phase decoder 13 that generates a decoded output signal at an output 13a. The signal at output 13a is coupled via a stage 14 to conductor d. As explained before, the signal on conductor d is coupled via switch Q to signal processing 16 in accordance with the control signal developed at control input g.

Stage 14 contains circuitry for detection of error conditions in the data of the signal at output 13a. When such error condition occurs, the signal at output 13a is decoupled from conductor d, corresponding to a mute condition. On the other hand, if no error occurs, the signal at output 13a is coupled via stage 14 to conductor d. The signal in conductor d is coupled via switch Q to signal processing unit 16 such as a DAT and is recorded therein.

The signal at output 13a is also coupled to a stage 15. Stage 15 contains memory and timing control circuitry for deriving status or subcode data from the signal at output 13a. The status or subcode data may contain channel information such as, for example, sampling frequency, emphasis, program time and program start. The output signal of stage 15 is coupled to conductor $f_6$ for enabling microprocessor 8 of FIG. 1 to read out and store the subcode data. The subcode data is processed in microprocessor 8 and displayed in indicator unit 9.

Thus, the procedure for selecting one of the signals developed at terminals A, B and C is accomplished by microprocessor 8 in accordance with the priority schedule. As explained before, microprocessor 8 generates, in accordance with the priority schedule, the signal on conductor g that causes switch Q to select the signal in conductor d or the signal at terminal C. If the signal selected is the signal developed in conductor d, microprocessor 8 also generates the corresponding signals in conductors $f_2-f_6$ of FIG. 2 at corresponding levels or states that define the frequency of the signal in conductor 12a. Such frequency is the expected clock frequency, in accordance with the priority schedule, of the signal in conductor Sa. When the lock-in condition in PLL 10 is detected by microprocessor 8 by testing the state of the signal in conductor $f_5$, the signal source selection process is terminated and the connection state of each of switch S of FIG. 2 and switch Q of FIG. 1 is maintained at the same state until a new selection procedure is initiated. Such new selection procedure may start for example, by an entry of a control instruction through a remote control, not shown. A new selection procedure may also be started automatically through microprocessor 8 in case, for example, signal outage occurs at the signal source that is currently selected.

What is claimed:

1. A signal recorder or reproducer apparatus, comprising:

a plurality of input terminals, each receiving a corresponding input signal from a corresponding signal source;

a frequency detector comprising a phase-lock loop circuit coupled to said input terminals for producing a detector output signal in accordance with an output signal of said phase-lock-loop circuit such that the presence of said detector output signal indicates that a frequency of a given input signal of the input signals is within a predetermined range of frequencies, said detector including means for detecting that said phase-lock-loop circuit is in a non phase-locked condition;

means for establishing a priority among the input signals received at said input terminals, said priority being determined by a priority schedule in accordance with a selection procedure;

means coupled to said input terminals and to said priority establishing means and responsive to said detector output signal for selecting from said input terminals that input terminal which receives said input signal having both said frequency that is within said predetermined range of frequencies as determined by said detector output signal and said priority as determined by said priority obtained from said priority schedule in accordance with said selection procedure; and signal recording or reproducing means coupled to the selected input terminal for recording or reproducing the input signal that is received at said selected input terminal.

2. An apparatus according to claim 1 further comprising, means for developing at one of said input terminals an analog signal wherein, when none of the other ones of said input signals that have higher priority than said analog signals is at said frequency that is within said predetermined range, said selecting means selects said one of said input terminals where said analog signal is developed such that said analog signal is recorded or reproduced in said signal recording or reproducing means.

3. An apparatus according to claim 1 wherein said detector is coupled to a microprocessor that establishes said priority schedule.

4. An apparatus according to claim 3 further comprising, means for changing a sequence of said priority schedule.

* * * * *